US012748577B1

(12) United States Patent
Shojaie et al.

(10) Patent No.: US 12,748,577 B1
(45) Date of Patent: Sep. 29, 2026

(54) PREDICTING AUTOMATIC TRIGGERS FOR OBTAINING CODE SUGGESTIONS FROM A GENERATIVE MACHINE LEARNING MODEL

(71) Applicant: Amazon Technologies, Inc., Seattle, WA (US)

(72) Inventors: Mehdi Shojaie, Seattle, WA (US); Varun Kumar, Boston, MA (US); Murali Krishna Ramanathan, Los Altos, CA (US); Hantian Ding, New York, NY (US); Matthew Lee, Elmhurst, NY (US); Mahit Murthy, Bellevue, WA (US); Zixuan Lin, Dublin, CA (US); Shao Hua Lo, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 95 days.

(21) Appl. No.: 18/478,079

(22) Filed: Sep. 29, 2023

(51) Int. Cl.
*G06F 9/44* (2018.01)
*G06F 8/33* (2018.01)
*G06F 8/35* (2018.01)

(52) U.S. Cl.
CPC . *G06F 8/35* (2013.01); *G06F 8/33* (2013.01)

(58) Field of Classification Search
CPC .................................... G06F 8/35; G06F 8/33
See application file for complete search history.

(56) References Cited

U.S. PATENT DOCUMENTS

| | | | | |
|---|---|---|---|---|
| 9,235,978 | B1 | 1/2016 | Charlton | |
| 9,619,211 | B2 * | 4/2017 | McCollum | G06F 8/33 |
| 10,497,004 | B2 * | 12/2019 | Shaev | G06Q 30/0281 |
| 2020/0019493 | A1 * | 1/2020 | Ramakrishna | G06F 8/30 |
| 2021/0004210 | A1 * | 1/2021 | Evangelopoulos | G06F 8/33 |
| 2024/0069907 | A1 * | 2/2024 | Groenewegen | G06F 8/71 |

* cited by examiner

*Primary Examiner* — Qamrun Nahar
(74) *Attorney, Agent, or Firm* — S. Scott Foster; Kowert, Hood, Munyon, Rankin & Goetzel, P.C.

(57) ABSTRACT

Automated triggers for obtaining code suggestions may predicted for development environments. When characters are received to add to a code file, metadata describing the context of the code file for adding the received characters and past code suggestion behavior for a user of the development environment may be determined as input features for a machine learning model trained to predict whether to automatically trigger obtaining a code suggestion. If an auto trigger prediction is determined, then a generative machine learning model may be invoked to generate a code suggestion for a user and the code suggestion provided via an interface of the development environment.

17 Claims, 8 Drawing Sheets

PREDICTING AUTOMATIC TRIGGERS FOR OBTAINING CODE SUGGESTIONS FROM A GENERATIVE MACHINE LEARNING MODEL

BACKGROUND

Language models, such as Large Language Models (LLMs), and other generative machine learning models expand the capabilities of different systems to interact with and respond to text and other data items across a wide variety of subjects. For instance, generative machine learning models can be used to generate code suggestions to include in a code file. These code suggestions can then be used to supplement code written by a user.

Figure 1:
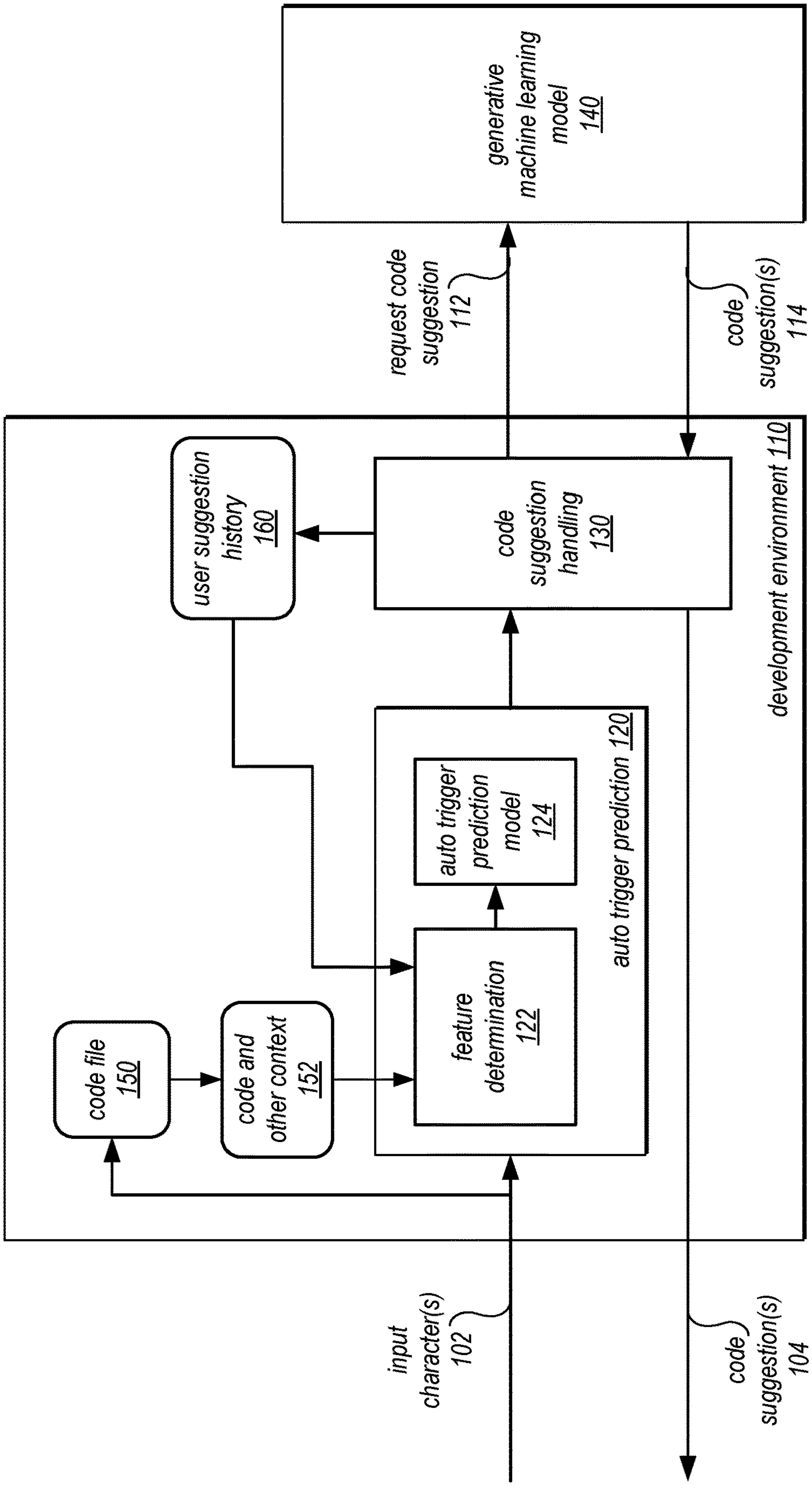
FIG. 1 is a logical block diagram illustrating predicting automatic triggers for obtaining code suggestions from a generative machine learning model, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Artificial intelligence (AI) assisted code completion tools can improve developer efficiency, for example by understanding context and suggesting relevant code snippets. However, code recommendation quality is dependent upon the trigger point—that is, the point at which the code is autogenerated. If the suggestion is generated too soon, the generative model may not receive enough context to provide a helpful suggestion, but generating a recommendation too late doesn't save the developer as much time. To address this challenge, this disclosure presents an AI coding assistant including a machine learning classifier that determines optimal trigger points based on factors such as past user behavior (whether they have accepted or rejected previous recommendations, their historical acceptance at different trigger points), code context, and the development environment. As the user types (or otherwise enters text) into the development environment, the classifier can determine whether or to provide a code suggestion at a given place. Beneficially, this can increase the rate of accepted code by allowing the system to learn the points at which suggestions are most often used.

Accordingly, various techniques for predicting automatic triggers for obtaining code suggestions from a generative machine learning model are described herein. Generative machine learning models refer to machine learning techniques that model different types of data in order to perform various data generative tasks given a prompt. For example, language models, such as large language models (LLMs), are one type of generative machine learning model that refer to machine learning techniques applied to model language, which may include natural language (e.g., human speech) and machine-readable language (e.g., programming languages, scripts, code representations, etc.). For generative machine learning models that model language, like programming languages, the generative machine learning models may take language prompts and generate corresponding programming language predictions (which may be referred to as code predictions or code suggestions).

Generative machine learning models that generate language, such as code specified in a programming language, are a form of machine learning that provides language processing capabilities with wide applicability to a number of different systems, services, or applications. More generally, machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time.

There have been many developments in large-scale machine learning and deep learning models. For example, GPT-3 is trained on 570 GB of text and consists of 175 billion parameters. While large models may have state-of-the-art performance, in various scenarios it may be desirable to deploy a smaller model. Knowledge distillation is a technique that transfers knowledge from a complex neural network (the "teacher model") to a simpler one (the "student model"). The teacher model is trained on labeled data, and the student model is trained to mimic the teacher's behavior using unlabeled data of "soft targets", which are probability distributions indicating the teacher's confidence in its predictions. By minimizing the difference between the student's predictions and the teacher's soft targets, the student model can learn from the teacher's knowledge and achieve better performance, even with fewer parameters. In some embodiments, a generative machine learning model may be a student model (or a teacher model).

For generative machine learning models, the "inference" may be the output predicted by the generative machine learning model to satisfy a prompt (e.g., code written in a programming language). A prompt may be an instruction and/or input text in one (or more) languages (e.g., in a programming language). Different generative machine learning models may be trained to handle varying types of prompts. Some generative machine learning models may be generally trained across a wide variety of subjects and then later fine-tuned for use in specific applications and subject areas. Fine-tuning refers to further training performed on a given machine learning model that may adapt the parameters of the machine learning model toward specific knowledge areas or tasks through the use of additional training data. For example, an LLM may be trained to recognize patterns in text and generate text predictions across many different scientific areas, literature, transcribed human conversations, and other academic disciplines and then later fine-tuned to be optimized to perform language tasks in a specific area, such as code-based tasks, like code suggestion as discussed in detail below with regard to FIG. 1.

While the use of generative machine learning models to produce code suggestions can aid developers when creating or editing code written a programming language, the timing of providing code suggestions can increase or decrease the quality and value of code suggestions. Moreover, the timing of providing code suggestions may vary from user to user, making rules-based approaches that do not account for user-specific behavior potentially provide disruptive or unhelpful numbers or timing of code suggestions. Accordingly, various techniques of predicting automatic triggers for obtaining code suggestions from a generative machine learning model may be implemented to improve the performance of code suggestion features in development environments. By making user-specific predictions for when to obtain and provide code suggestions, a development environment can increase the utility of a code suggestion feature to a developer, as well as more efficiently utilize computer resources to obtain and provide code suggestions (e.g., by eliminating/reducing the generation of unnecessary or unwanted code suggestions, each of which consumes resources such as compute capacity and network bandwidth to generate and provide to the user).

FIG. 1 is a logical block diagram illustrating predicting automatic triggers for obtaining code suggestions from a generative machine learning model, according to some embodiments. Development environment 110 may be implemented in a standalone system (e.g., user computing device) or as part of a service (e.g., on a host system implemented as part of a computing service of a provider network, such as provider network 200 in FIG. 2). Development environment 110 may offer many different code development tools or features, such as code file editing, debugging, compiling, translating, among others. Code suggestions may be a feature implemented or supported by development environment 110. To provide code suggestions, development environment may implement or have access to a generative machine learning model, such as generative machine learning model 140, which may be trained to generate code suggestions given some input features (e.g., a portion of a code file and input character(s), such as input character(s) 102).

In various embodiments, development environment 110 may intelligently determine when to request code suggestions, implementing an automatic trigger for code suggestions. As illustrated in FIG. 1, auto trigger prediction 120 may be implemented in order to predict automatic triggers for code suggestions using machine learning techniques. For example, one or more input characters(s) 102 may be received (e.g., via a text-based interface) to add to a code file 150 that is being edited using development environment 110. When the input character(s) 102 are received, they may be added to code file 150. Additionally, auto trigger prediction 120 may receive the input character(s) 120 in order to make an auto trigger prediction. Auto-trigger prediction 120 may be performed in responsive to different activation events. For example, auto-trigger prediction 120 may be activated at each keystroke (e.g., for each received character or input to a code file or code file interface). Other activation events may wait until greater amounts of data are received (e.g., multiple characters or single or multiple lines of characters entered), or based on the passage of time (e.g., every 2 seconds).

In addition to the input character(s), auto trigger prediction 120 may determine features other input features at 122 based on information from code file 150 as code and other context 152 and user suggestion history 160. For example, feature determination 122 may determine various metadata descriptive the development environment 110, the programming language being used and other information that is descriptive of the code file 150 and/or larger project/application to which code file 150 belongs. Such metadata may be provided in addition to code already present in code file 150 prior to receiving input character(s) 102 (e.g., a number immediately prior lines of code may be provided prior to a cursor). Additionally, past user responses to code suggestions may be provided to determine input features that are then fed to auto trigger prediction model 124.

Auto trigger prediction model may be implemented in various ways, including various types of ML classifiers, such as a binary classifier as discussed in detail below with regard to FIGS. 3-5. If an automatic trigger is not predicted (e.g., a prediction for the automatic trigger is below a confidence threshold), then no further action may be taken by auto trigger prediction 120 until another event that activates auto trigger prediction 120 is detected (e.g., another input character is received). If an automatic trigger is predicted, then an indication may be provided to code suggestion handling 130, which may obtain the appropriate input features (e.g., from code file 150 (including input character(s) 102) for making a request for code suggestion 112 to generative machine learning model 140. A code suggestion 114 may be returned to code suggestion handling 130, which may provide the code suggestion 104 to a user. FIG. 6, discussed below, provides an example interface via which code suggestions may be presented.

Please note that previous descriptions are not intended to be limiting, but are merely provided as an example of a development environment, generative machine learning model, and auto trigger prediction. Various other embodiments may also implement these techniques, as discussed in detail below.

The specification next includes a general description of a provider network, which may implement a code development service that may implement predicting automatic triggers for obtaining code suggestions from a generative machine learning model. Then various examples of a code development service are discussed, including different components/modules, or arrangements of components/module that may be employed as part of implementing a code development service in the provider network. A number of different methods and techniques for predicting automatic triggers for obtaining code suggestions from a generative machine learning model are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
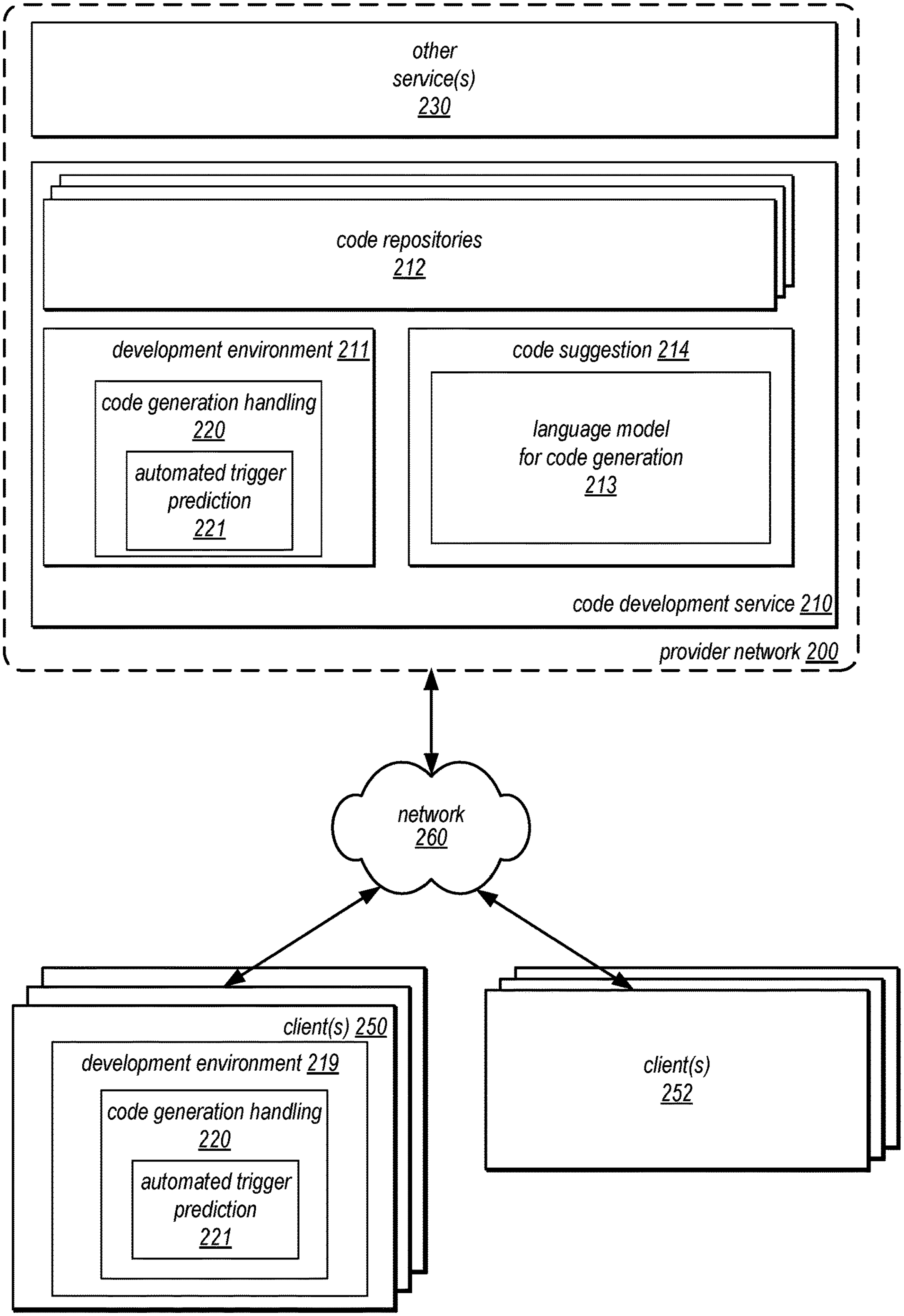
FIG. 2 is a logical block diagram illustrating a provider network that implements different services including a code development service that may implement predicting automatic triggers for obtaining code suggestions from a generative machine learning model, according to some embodiments.

FIG. 2 is a logical block diagram illustrating a provider network that implements different services including a code development service that may implement predicting automatic triggers for obtaining code suggestions from a generative machine learning model, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

As noted above, provider network 200 may implement various computing resources or services, such as code development service 210, and other service(s) 230 which may be any other type of network based services, including various other types of storage (e.g., database service or an object storage service), compute, data processing, machine learning, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of code development service 210) may be implemented by a particular node or may be distributed across several nodes. In some embodiments, a given node may implement the functionality of more than one service system component (e.g., more than one data store component).

Code development service 210 may be implemented by provider network 200, in some embodiments. Code development service 210 may implement various features for writing code for different systems, applications, or devices, providing features to recommend, identify, review, build, and deploy code. For example, code development service 210 may implement development environment 211. Code development environment 211 may offer various code entry tools (e.g., text, diagram/graphics based application development) to specify, invoke, or otherwise write (or cause to be written) code for different hardware or software applications.

Code development service 210 may implement code suggestion 214 which may implement various computing resources to host and implement LLM code generation 213 in a scalable fashion to deliver on-demand code suggestions across large numbers of clients using high-powered machine learning models, such as LLMs, for high-quality code suggestion results. For example, code suggestion 214 may implement workload balancing and request management features to handle and return code suggestions in a timely manner to provide real-time code suggestions with little or no apparent latency to code generation handling 220 (within or without provider network 200).

In various embodiments, the code generation tasks discussed above, code suggestion 214 may generate code based on text input in development environment 211 or 219 (e.g., utilizing a plug-in or other connection that implements code generation handling 220, including automated trigger prediction 221 (like auto trigger prediction 120 discussed above) which may provide real-time analysis and suggestion of code as the code is entered into the development environment 211 or 219) or some other interface (e.g., via client(s) 252 utilizing a natural language interface to "translate" or "request" code generation tasks, such as a request for a code suggestion). These tasks may use a generative machine learning model that is a language model for code generation 213, such as an LLM tuned to provide code suggestions in one or more programming languages. Alternatively, different generative machine learning models for different programming languages may be implemented. The generative machine learning models may be trained on a large corpus of code which may include code repositories or snippets from a variety of sources.

Code development service 210 may implement (or have access to) code repositories 212. Code repositories 212 may store various code files, objects, or other code that may be interacted with by various other features of code development service 210 (e.g., development environment 211 to write, build, compile, and/or test code). Code repositories 215 may implement various version and/or other access controls to track and/or maintain consistent versions of collections of code for various development projects, in some embodiments. In some embodiments, code repositories may be stored or implemented external to provider network 200 (e.g., hosted in private networks or other locations).

Code development service 210 may implement an interface to access and/or utilize various features of code development service 210. Such an interface may include various types of interfaces, such as a command line interface, graphical user interface, and/or programmatic interface (e.g., Application Programming Interfaces (APIs)) in order to perform requested operations, including operations of development environment 211. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Generally speaking, clients 250 and 252 may encompass any type of client configurable to submit network-based requests to provider network 200 via network 260, including requests for services (e.g., a request for code search or suggestion, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, clients 250 (and 252) may provide access to provider network 200 to other applications in a manner that is transparent to those applications. For example, client 250 may integrate with code development service 210. However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 and 252 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Development environments may implement features to interact with code suggestion 214 offered by code development service. As noted above, these development environments may be locally hosted on client devices external to provider network 200 (e.g., on clients 250) or be hosted and accessed remotely by clients 252 on computing resources of code development service 210 that implement development environment 211. In either embodiment, automated trigger prediction 221 may be implemented as part of code generation handling 220. In at least some embodiments, code generation handling 220 as well as various other features that take advantage of code development service 210 may be implemented as plugin (e.g., a software component that can be added to or enabled in an existing application, such as development environments 211 and 219). In some instances, the source (e.g., developer or provider) of a development environment may be different than the code development service 210. Accordingly, different respective versions of the plugin to add code development service 210 features to different respective development environments may be made available by code development service 210, allowing users to utilize a development environment of their choice while still gaining access to features of code development service 210, such as code suggestion 214.

Figure 3:
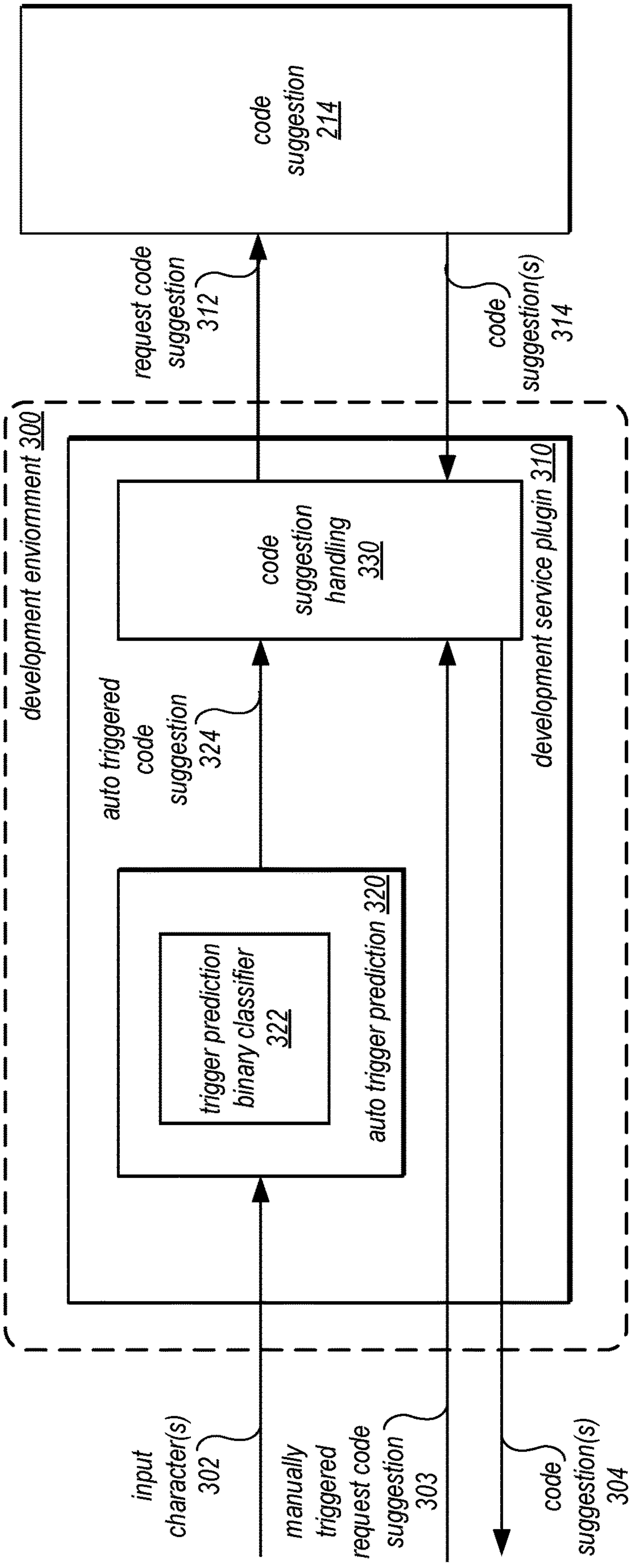
FIG. 3 is a logical block diagram illustrating interactions for manual and automated triggers for code suggestions, according to some embodiments.

FIG. 3 is a logical block diagram illustrating interactions for manual and automated triggers for code suggestions, according to some embodiments. As depicted in FIG. 3, development environment 300 includes development service plugin 310 which may support, among other features, the ability to perform automated triggering of code suggestions, as well as manual requests for a code suggestion 303 (e.g., via a user interface element added by development service plugin 310 to development environment 300).

As illustrated, input character(s) 302 may be received. In some embodiments, individual key-strokes or other character input mechanisms, including voice, touch, or user interface elements, may activate analysis by auto trigger prediction 320. As illustrated in FIG. 3, a trigger prediction binary classifier model 322 may be implemented to make an auto trigger prediction. Training and validation of a binary classifier model 322 is discussed in detail below with regard to FIGS. 4 and 5. However, in other embodiments, other trained classification models that can make auto trigger predictions according to determined input features may be implemented (e.g., additional labels may be predicted in addition to accept or reject, making the classifier "non-binary"). Although not depicted, like FIG. 1, auto trigger prediction 320 may have access to context and other information for a code file being edited by input character(s) 302 as well as user behavior information (e.g., for a single code editing session or across multiple code editing sessions). FIG. 4 provides further details of example input features that may be determined.

If an auto trigger is predicted (which may include determining that a confidence score or value of the prediction is above a confidence threshold), an auto triggered code suggestion 324 may be provided to code suggestion handling 330. Code suggestion handling 330 may construct the appropriate request 312, including various input features, such as relevant portions of a code file being edited, and send the request 312 to code suggestion 214. In some embodiments, a confidence score or other predicted value or output of an auto trigger binary classification model 322, may be included in a code suggestion request 312 (which may allow code suggestion 214 to determine the number or confidence of code suggestions to return according to features, such as the confidence value for triggering code suggestion). Code suggestion 214 may apply a generative machine learning model (e.g., an LLM) as discussed above and return one (or more) code suggestion(s) 314. Code suggestion handling 330 may format, rank, filter, or otherwise process the returned code suggestions and provide them, as indicated at 304 via development environment 300 (e.g., as depicted in FIG. 6 below). In some implementations, both the auto-trigger model and the code generating model may have confidence scores, where the confidence score of the auto-trigger model reflects the likelihood that the presently evaluated point is a good one at which to provide a suggestion, and the confidence score of the generative model reflects the likelihood that the generated code will be accepted by the user. These two confidence scores may be evaluated together to determine whether to display a given suggestion to the user. In some implementations, the confidence score of the auto-triggering classifier may be used to tune code generation parameters such as sampling approach, temperature, and the like.

Figure 4:
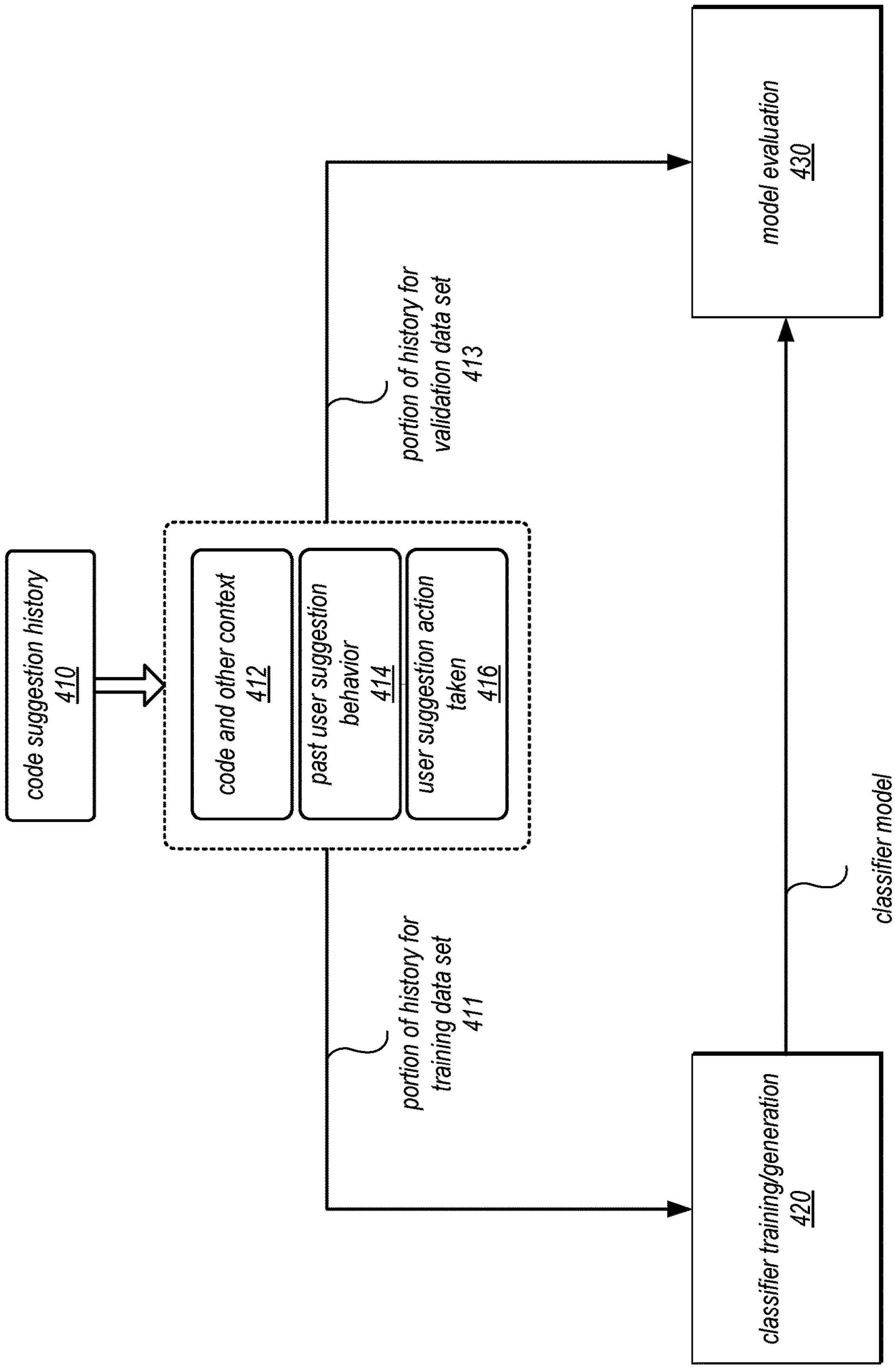
FIG. 4 is a logical block diagram illustrating generation and validation of a machine learning model for predicting auto triggers for code suggestions, according to some embodiments.

FIG. 4 is a logical block diagram illustrating generation and validation of a machine learning model for predicting auto triggers for code suggestions, according to some embodiments. In various embodiments, code suggestion history 410 may be collected. For example, code suggestion history 410 may be collected that across a large number of users or a larger number of editing sessions for a particular user (e.g., in the event it is desirable to generate a user-specific auto trigger prediction model). Code suggestion history may include the information from which training and validation, as indicated at 411 and 413 respectively, can be performed for generating a binary classification model.

For example, code context 412 may include metadata that is determined and describes various features or attributes of the code file to which input character(s)) are added and which may be considered as model input features. Code and other context 412 may include, but are not limited, to:

- development environment type (e.g., which development environment application is used)
- operating system (e.g., which operating system is used)
- length of the last line of the left context (e.g., how many characters)
- last character/token before cursor (e.g., what character)
- length of the right context
- cursor offset
- line number
- timestamp
- programming language
- activation event (e.g., user-requested code suggestion, rule-based activation, such as a carriage return or special character, or a detected keystroke)

Past user suggestion behavior 414 may also be determined from code suggestion history 410. For example, past user suggestion behavior 414 may include whether a previous code suggestion was accepted, rejected, or ignored, an aggregation of past behavior (e.g., for a period of time or number of code suggestions, such as the last 4 code suggestions), and the time difference between code suggestions.

Code context 412 and past user suggestion behavior 414 can then be used for classifier training/generation 420 (with user suggestion action taken 416 to be used as the ground truth for making iterative generation decisions as part of classifier training/generation 420). Classifier training/generation 420 may utilize supervised machine learning techniques to train or construct different types of binary classification models. For example, in some embodiments, the binary classification model may be a decision tree that categorizes and describes a given data set (e.g., the training data set provided at 411). Such techniques may use the ground truth data to iteratively fit a set of "if then, else" decision rules for values of different input features to a non-parametric distribution (e.g., a sine curve) in order to generate the binary classification decision tree.

Figure 5:
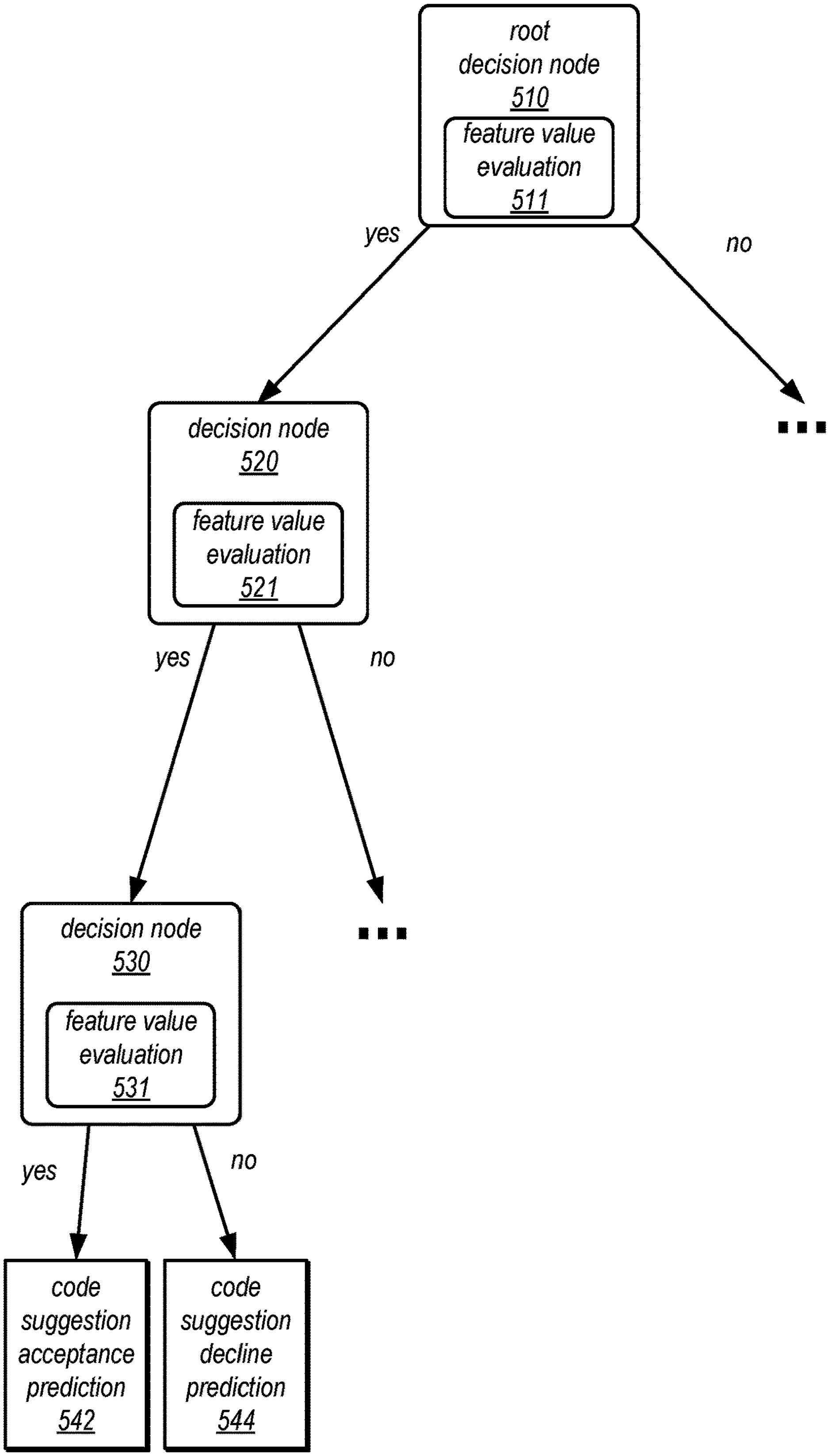
FIG. 5 illustrates an example of binary classification decision tree, in some embodiments.
Figure 6:
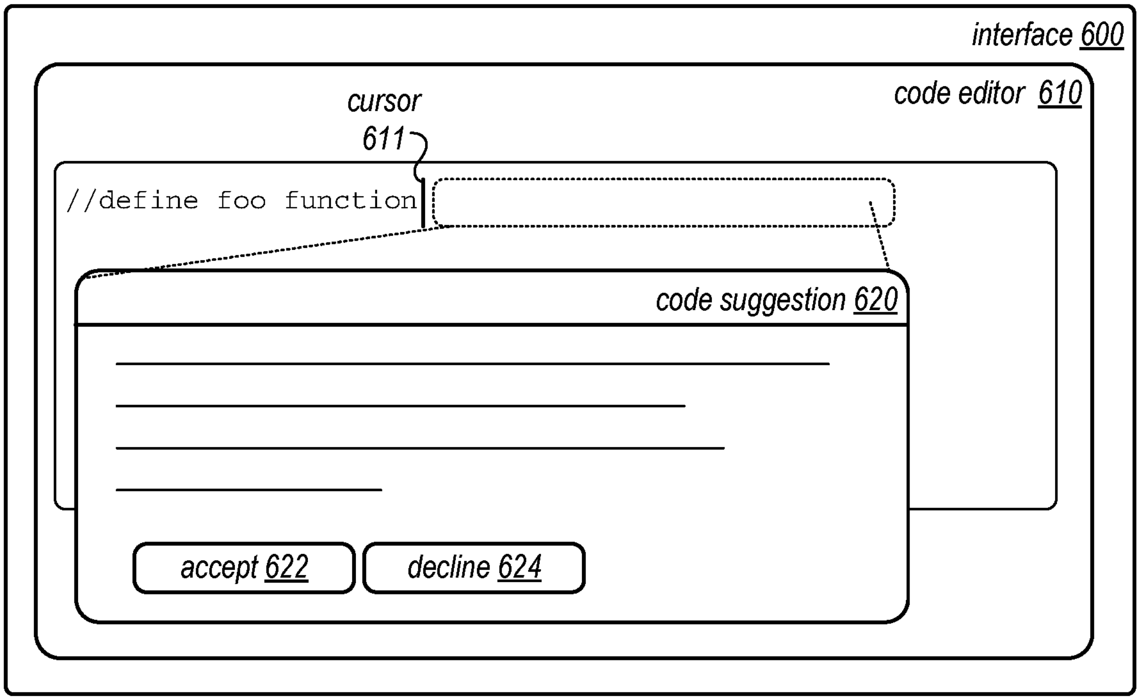
FIG. 6 is an example user interface for providing a code suggestion according to a predicted automated trigger, according to some embodiments.

For instance, FIG. 5 illustrates an example of binary classification decision tree, in some embodiments. Each decision node, such as root decision node 510, decision node 520, and decision node 530, may make a decision to choose between paths according to an evaluation rule, respectively indicated as feature value evaluations 511, 521, and 531 (which may be the "if then, else") rules. Leaf nodes, such as leaf nodes 542 and 544, may represent classification predictions (e.g., what percentage of code suggestions if an auto trigger were performed would be accepted). Leaf node 542, for example, may indicate predicted acceptance of a code suggestion along with a predicted acceptance percentage (e.g., 67% of suggestions are likely to be accepted given these input features). Leaf node 544 may indicate predicted rejection of a code suggestion along with a predicted rejection percentage (e.g., 73% of suggestions are likely to be accepted given these input features). These percentages may be a treated or converted into a respective confidence score for an auto trigger prediction (e.g., if a code suggestion has a greater than 60% chance of acceptance at a particular leaf node, then an auto trigger may be predicted).

Although FIG. 5 depicts a binary decision tree classifier, in other embodiments, different binary classifiers may be trained or generated. For example, logistic regression techniques may be performed to train a logistic function to fit the portion of history for training data set 411, so that the output of the trained logistic function corresponds binary classification for acceptance or rejection of a code suggestion given the input features (e.g., on a per keystroke basis). Different combinations of input features (e.g., from code context 412 and past user suggestion behavior 414) may be used in different training runs and evaluated using model evaluation 430. In this way, a best performing binary classification decision tree model may be implemented as the model 322. Note that in other embodiments, different types of binary classification models may be used (e.g., based on neural networks or other model techniques or architectures). In some embodiments, auto trigger prediction models may be evaluated or considered prior to integration with an auto trigger prediction feature for code suggestion based on their latency and/or resource utilization in order to satisfy performance requirements of a code development service plugin 310. Similar considerations may be made in other embodiments with different performance (e.g., non-plugin implementations) which may result in different results. For example, if code suggestion is detected or triggered in hosted/service environment (e.g., development environment 211 in FIG. 2), more computing resources may be available to host a more resource intensive classifier without introducing additional latency to the code suggestion data path.

FIG. 6 is an example user interface for providing a code suggestion according to a predicted automated trigger, according to some embodiments. Interface 600 (e.g., an integrated development environment or various other types of interfaces) may implement a code editor 610 element which displays code that may be edited as discussed above. As indicated at 611, a cursor marking the location at which one or more characters have been added to a code file may indicate a starting point at which a code suggestion 620, obtained responsive to a predicted auto trigger may be inserted. Code suggestion may include or more characters, words, lines, or other symbols that may be entered as code if accepted via user interface element 622. If the code suggestion is not desired, then the suggestion may be declined via user interface element 624. The code suggestion 620 may be ignored (e.g., by continuing to enter further characters starting from cursor 611). Although one code suggestion is depicted at 620, in some embodiments, multiple code suggestions that include alternatives (which may be ranked or ordered) may be provided via interface 600.

Figure 7:
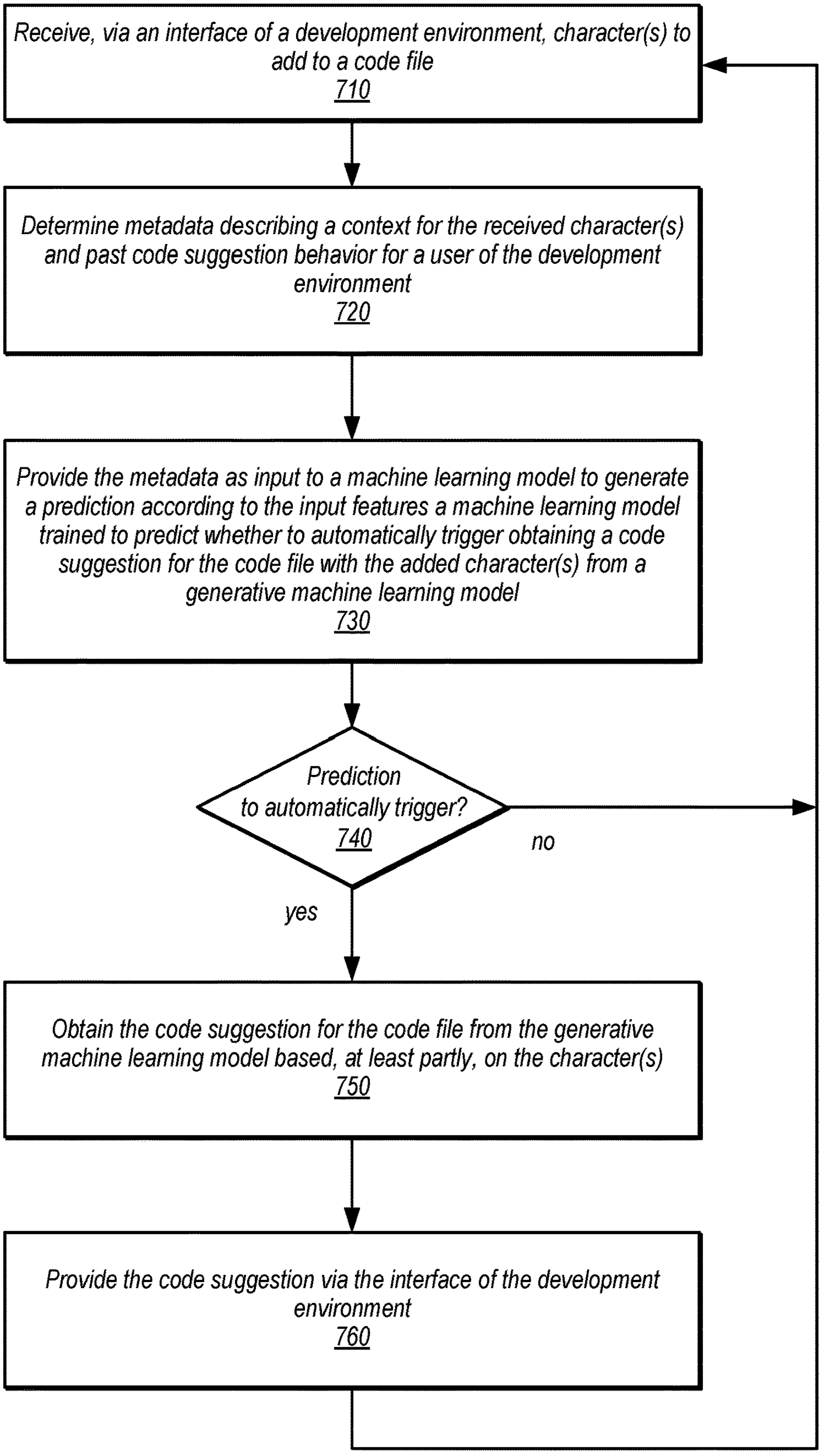
FIG. 7 is a high-level flowchart illustrating techniques and methods to implement predicting automatic triggers for obtaining code suggestions from a generative machine learning model, according to some embodiments.

The examples of predicting automatic triggers for obtaining code suggestions from a generative machine learning model discussed above with regard to FIGS. 2-7B have been given in regard to one example of a code development service. Various other types of code generation systems may implement these techniques which seek to provide code suggestions by a language machine learning model. FIG. 7 is a high-level flowchart illustrating techniques and methods to implement predicting automatic triggers for obtaining code suggestions from a generative machine learning model, according to some embodiments. These techniques may be implemented using various components of a provider network as described above with regard to FIGS. 2-6.

As indicated at 710, one or more character(s) to add to a code file may be received via an interface of a development environment, in some embodiments. For example, the character(s) may be entered via a text interface that supports key-stroke or other alphanumeric character entry user interface elements. In some embodiments, the characters may be obtained using voice-to-text or other techniques for obtaining edits to a code file.

As indicated at 720, metadata describing a context for the received character(s) and past code suggestion behavior of a user of the development environment may be determined, in some embodiments. For example, metadata describing the context may include various features of the development environment itself (e.g., type/source of development environment, operating system) and features of the code file/added character(s) (e.g., how many lines into the code file, how many characters before and after a cursor, programming language, etc.). The past code suggestion behavior of the user may be obtained by accessing a user/user session history maintained for editing the code file, which may store past actions (e.g., accept, reject, ignore) for previously provided code suggestions. In some embodiments, the input features may be formatted, translated, or represented as a feature vector that maps different input features to respective values (e.g., a number representing different product types, a number representing the programming language, etc.).

As indicated at 730, the metadata may be provided as input to a machine learning model trained to predict whether to automatically trigger obtaining a code suggestion for the code file with the added character(s) from a generative machine learning model to generate a prediction according to the input, in some embodiments. For example, an interface, such as an API call, may be populated and used to invoke the machine learning model. As discussed above with regard to FIGS. 1 and 3-5, different types of machine learning models, such as classifier machine learning models (e.g. a binary classification decision tree model or logistic regression binary classifier) may be used. A determination may be made, as indicated at 740, as to whether a prediction is automatically triggered. For example, the trigger prediction may include a value or score, which may be compared with a threshold. If the value or score satisfies the threshold, then the auto trigger may be predicted. In some embodiments, the threshold may be specified according to a user interface or other control, allowing a user to increase or decrease the sensitivity (and thus frequency) of receiving auto triggered code suggestions. For example, a user preference interface may categorize differing sensitivity levels as "I would like to receive code suggestions frequently," "I would like to receive code suggestions moderately," and "I would like to receive code suggestions infrequently." These different sensitivity levels may then be mapped to difference threshold values, which may be specified according to a user's selection via the user preference interface.

As indicated at 750, for a predicted auto trigger, the code suggestion for the code file may be obtained from the generative machine learning model, in some embodiments. For example, a request or invocation may be sent with code context (e.g., one or more past lines of code and/or other input features) in order to generate a code suggestion. The code suggestion may then be provided via the interface of the development environment, as indicated at 760. As indicated by the arrows looping back to element 710, the auto trigger prediction techniques may be repeated for the duration of a code file editing session (or until the auto trigger feature is disabled for code suggestions).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 8:
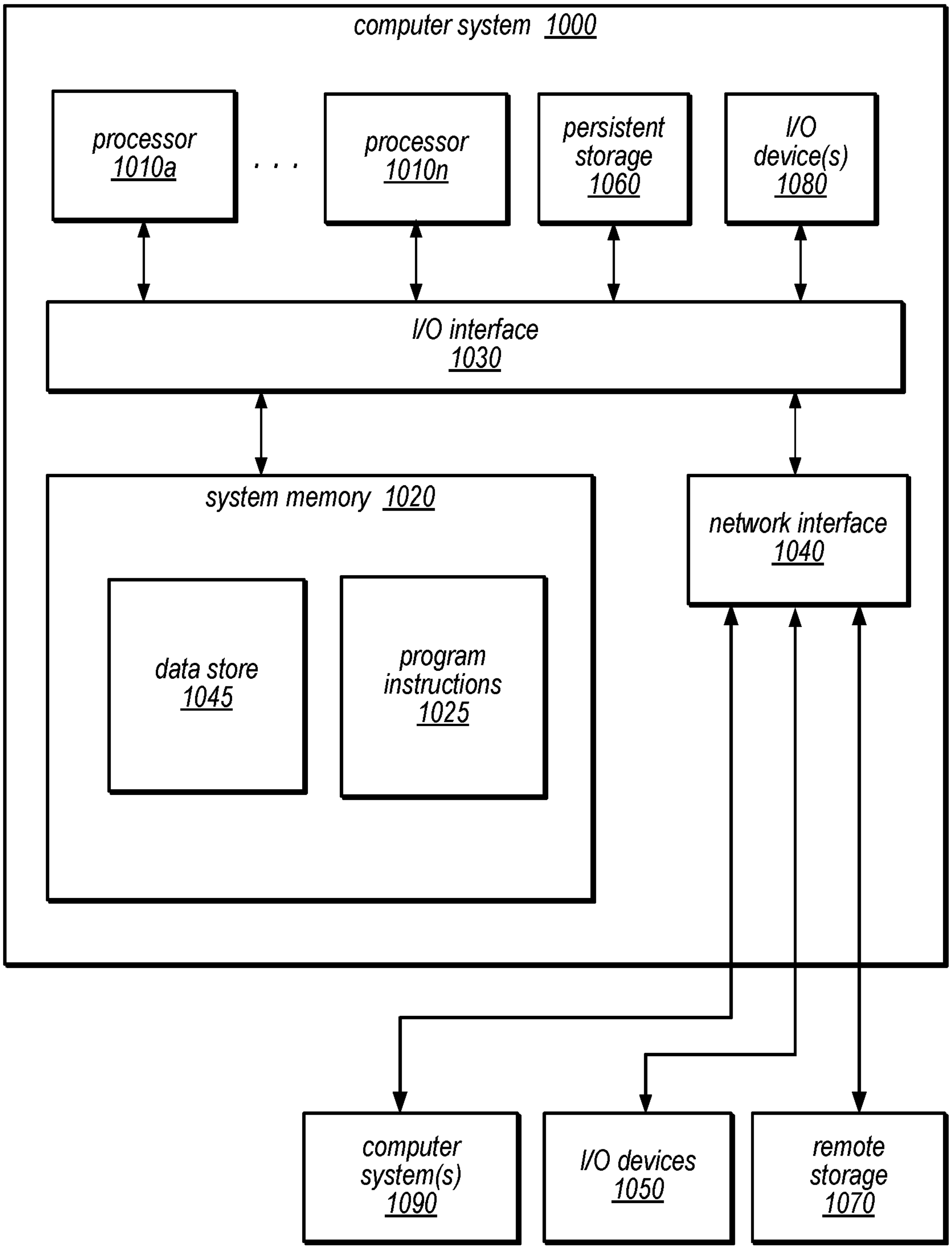
FIG. 8 is a block diagram illustrating an example computing system, according to some embodiments.

The techniques discussed above may be executed on one or more computer systems, which may interact with various other devices. FIG. 8 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM. EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments, such as various techniques for discovering matching code sources according to index and comparative similarity. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to:

responsive to receipt, via an interface of a development environment, of individual ones of a plurality of characters to add to a code file:

determine metadata describing a context for the code file and past code suggestion behavior for a user of the development environment;

provide the metadata as input to a machine learning classifier model trained to determine whether to automatically trigger obtaining a code suggestion generated by a language machine learning model trained to predict further code to add to code files;

responsive to a determination to automatically trigger obtaining the code suggestion:

obtain the code suggestion from the language machine learning model based at least partly on the plurality of characters; and provide the code suggestion via the interface of the development environment; and wherein the language machine learning model is hosted as part of a code development service offered by a provider network, and wherein the program instructions implement a plugin for the development environment that, upon addition to the development environment, the plugin is configured to enable the user to receive code suggestions from the code development service in the development environment.

2. The system of claim 1, wherein, to determine the metadata describing the context for the code file, the program instructions cause the at least one processor to determine one or more features descriptive of the development environment and one or more features descriptive of the code file.

3. The system of claim 1, wherein, to determine the past code suggestion behavior for the user, the program instructions cause the at least one processor to aggregate respective actions from a user suggestion history for a plurality of code suggestions previously provided to the user.

4. A method, comprising:

receiving, via an interface of a development environment, one or more characters to add to a code file, wherein the one or more characters are associated with a user of the development environment;

determining metadata describing a context for the received one or more characters and past code suggestion behavior for the user of the development environment;

providing the metadata as input features for a machine learning model trained to predict whether to automatically trigger obtaining a code suggestion for the code file with the one or more added characters from a generative machine learning model, wherein a prediction of the machine learning model is to automatically trigger obtaining the code suggestion from the generative machine learning model;

responsive to the prediction to automatically trigger obtaining the code suggestion:

obtaining the code suggestion from the generative machine learning model based, at least in part, on the one or more characters; and providing the code suggestion via the interface of the development environment; and wherein the language machine learning model is hosted as part of a code development service offered by a provider network, and wherein the development environment implements a plugin that, upon addition to the development environment, enables the user to receive code suggestions from the code development service in the development environment.

5. The method of claim 4, further comprising:

receiving, via the interface of the development environment, a further character to add to the code file;

determining further metadata describing a context for the received further character and past code suggestion behavior for the user of the development environment as further input features for the machine learning model; and providing the further metadata as further input to the machine learning model to generate a further prediction according to the further input features, wherein the further prediction is to not automatically trigger obtaining a further code suggestion from the generative machine learning model.

6. The method of claim 4, wherein the machine learning model is a binary classifier.

7. The method of claim 4, wherein the prediction is determined to automatically trigger obtaining the code suggestion according to a comparison of a confidence score for the prediction with a threshold, wherein the threshold value is specified according to a request received via the interface of the development environment.

8. The method of claim 4, wherein determining the metadata describing the context for the one or more characters comprises determining one or more features descriptive of the development environment and one or more features descriptive of the code file.

9. The method of claim 4, wherein determining the past code suggestion behavior for the user comprises aggregating respective actions from a user suggestion history for a plurality of code suggestions previously provided to the user.

10. The method of claim 4, further comprising determining to display the code suggestion based at least partly on a first confidence score generated for the prediction to automatically trigger and a second confidence score generated for the code suggestion from the generative machine learning model.

11. The method of claim 4, wherein the determining the metadata describing the context of the one or more characters and the past code suggestion behavior and the invoking the machine learning model are performed responsive to receiving the one or more characters.

12. One or more non-transitory, computer-readable storage media, storing program instructions that when executed on or across one or more computing devices cause the one or more computing devices to implement:

responsive to receiving, via an interface of a development environment, one or more characters to add to a code file:

determining metadata describing a context for the received one or more characters and past code suggestion behavior for a user associated with the development environment;

providing the metadata as input to a machine learning model trained to predict whether to automatically trigger obtaining a code suggestion for the code file with the one or more added characters from a generative machine learning model;

invoking the machine learning model to generate a prediction according to the metadata, wherein a prediction of the machine learning model is to automatically trigger obtaining the code suggestion from the generative machine learning model;

responsive to the prediction to automatically trigger obtaining the code suggestion:

obtaining the code suggestion from the generative machine learning model based, at least partly, on the one or more characters; and providing the code suggestion via the interface of the development environment; and wherein the language machine learning model is hosted as part of a code development service offered by a provider network, and wherein the program instructions implement a plugin for the development environment that, upon addition to the development environment, the plugin is configured to enable the user to receive code suggestions from the code development service in the development environment.

13. The one or more non-transitory, computer-readable storage media of claim 12, storing further program instructions that when executed on or across the one or more computing devices, cause the one or more computing devices to further implement:

receiving, via the interface of the development environment, a further character to add to the code file;

determining further metadata describing a context for the received further character and past code suggestion behavior for the user of the development environment as further input features for the machine learning model; and providing the further metadata as further input to the machine learning model to generate a further prediction according to the further input, wherein the further prediction is to not automatically trigger obtaining a further code suggestion from the generative machine learning model.

14. The one or more non-transitory, computer-readable storage media of claim 12, wherein the prediction is determined to automatically trigger obtaining the code suggestion according to a comparison of a confidence score for the prediction with a threshold, wherein the threshold value is specified according to a request received via the interface of the development environment.

15. The one or more non-transitory, computer-readable storage media of claim 12, wherein, in determining the metadata describing the context for the code file, the program instructions cause the one or more computing devices to implement determining one or more features descriptive of the development environment and one or more features descriptive of the code file.

16. The one or more non-transitory, computer-readable storage media of claim 12, wherein, in determining the past code suggestion behavior for the user, the program instructions cause the one or more computing devices to implement aggregating respective actions from a user suggestion history for a plurality of code suggestions previously provided to the user as one of the input features.

17. The one or more non-transitory, computer-readable storage media of claim 12, wherein to generate the code suggestion, the program instructions cause the one or more computing devices to use a confidence score generated for the prediction to automatically trigger to tune parameters of the generative machine learning model.

* * * * *